US007186877B1

(12) United States Patent
Morrissey et al.

(10) Patent No.: US 7,186,877 B1
(45) Date of Patent: Mar. 6, 2007

(54) CHEMICAL DETOXIFICATION OF VESICANTS AND RELATED CHEMICALS IN MOBILE DISPOSAL SYSTEMS

(75) Inventors: Kevin M. Morrissey, Stevensville, MD (US); H. Dupont Durst, Bel Air, MD (US); Lucille P. Forrest, Edgewood, MD (US); Mary P. Weiss, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/240,782

(22) Filed: Sep. 27, 2005

Related U.S. Application Data

(60) Provisional application No. 60/677,756, filed on May 4, 2005.

(51) Int. Cl.
*A62D 3/00* (2006.01)
(52) U.S. Cl. ...................... 588/401; 588/313
(58) Field of Classification Search ................ 588/313, 588/316, 320, 401, 406, 407, 900; 86/50
See application file for complete search history.

(56) References Cited

U.S. PATENT DOCUMENTS

| 5,545,800 | A | * | 8/1996 | Upadhye et al. ............... 75/706 |
| 5,998,691 | A | * | 12/1999 | Abel et al. ................... 149/124 |
| 6,121,506 | A | * | 9/2000 | Abel et al. ................... 588/318 |
| 6,455,751 | B1 | * | 9/2002 | Hoffman et al. ............. 588/320 |
| 6,881,383 | B1 | * | 4/2005 | Tschritter et al. ........... 422/165 |
| 6,960,701 | B2 | * | 11/2005 | Morrissey ................... 588/313 |
| 2005/0192472 | A1 | * | 9/2005 | Quimby et al. ............. 588/321 |

OTHER PUBLICATIONS

John Didlake, "Processing Lewisite Munitions in the Explosive Destructive System", CWD2004, May 25-27, 2004, St. Petersburg, Russia.*
Tricia Weiss, et al., "Processing of Lewisite Munitions in the Explosive Destructive System", dated Mar. 2, 2005, downloaded by the examiner from http://www.dstl.gov.uk/technology_transfer/cwd/2005/proceedings53.pdf on Dec. 9, 2005.*
John Didlake, "Processing Lewisite in the Explosive Destructive System", CWD2005 Briefing, Apr. 11-14, 2005, Edinburgh, Scotland.*
Lucy Forrest, et al., "Treatment Studies For Lewisite and Arsenical-Based Munition Fills", Environmental Forum, May 2005, no date given (submitted as pp. 31-68 of U.S. Appl. No. 60/677,756).*
Thomson, J., et al, "Tests for Decontamination of Lewisite on Human Skin", Office of Scientific Research and Development No. 3501, dtd Apr. 18, 1944.

* cited by examiner

*Primary Examiner*—Edward M. Johnson
(74) *Attorney, Agent, or Firm*—Ulysses John Biffoni

(57) ABSTRACT

Methods and systems for processing vesicants as well as other irritants are described. In some methods a vesicant, for example, a Lewisite such as the L1 form, the L2 form, L3 form, or combination thereof, is combined with permanganate, for example, as an aqueous solution of sodium permanganate. The methods can include releasing the vesicants or irritants from a munition, for example, by explosively rupturing the munition.

30 Claims, 1 Drawing Sheet

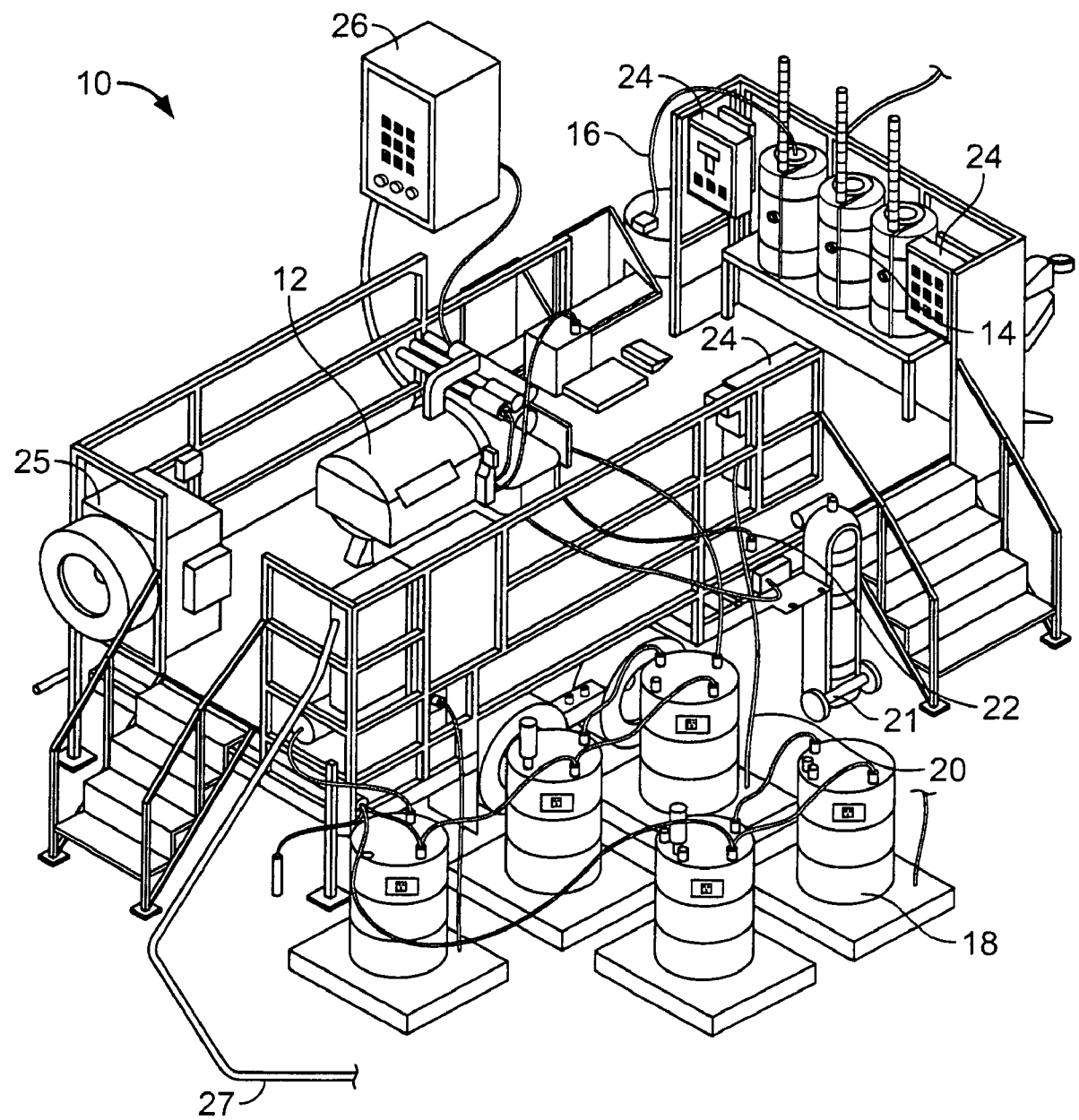

CHEMICAL DETOXIFICATION OF VESICANTS AND RELATED CHEMICALS IN MOBILE DISPOSAL SYSTEMS

CROSS REFERENCE TO RELATED APPLICATION

This application claims the benefit of U.S. provisional application No. 60/677,756, titled CHEMICAL DETOXIFICATION OF VESICANTS AND RELATED CHEMICALS IN MOBILE DISPOSAL SYSTEMS, filed May 4, 2005, by Kevin Morrissey et al., which application is incorporated herein by reference in its entirety.

GOVERNMENTAL INTEREST

The invention described herein may be manufactured, used and licensed by or for the U.S. Government.

TECHNICAL FIELD

The present invention relates to methods and systems for processing vesicants as well as other irritants.

BACKGROUND

Vesicants (e.g., blistering agents) and other irritants (e.g., lacrimators) are known (e.g., for military purposes). Some vesicants are arsenic-based. Lewisite is an example of an arsenic-based vesicant and is a powerful respiratory irritant. Lewisite exists in at least three forms: 2-chlorovinylarsonous dichloride (designated L1), bis (2-chlorovinyl) arsinous chloride (designated L2), and tris (2-chlorovinyl) arsine (designated L3). Other examples of arsenic-based vesicants include diphenylchloroarsine ("DA") phenyldichloroarsine ("PD"). A related arsenic-based compound, triphenylarsine ("TPA") is an irritant. Additional examples of vesicants includes mustards (e.g., sulfur and nitrogen mustards).

Vesicants and other irritants are present in munitions (e.g., rockets), containers (e.g., drums or tanks), and other locations (e.g., contaminated land or water). In addition to toxic properties of the materials themselves, their surroundings can make them unsuitable for long-term storage or difficult to handle safely. For example, the munitions or containers may be prone to leakage or (for munitions) explosion.

SUMMARY

The present invention relates to methods and systems for processing vesicants as well as other irritants.

One aspect of the invention relates to a method for processing an arsenic-based vesicant. The method includes combining at least one liquid arsenic-based vesicant and permanganate.

In some embodiments, the arsenic-based vesicant includes at least one Lewisite (e.g., at least one of bis (2-chlorovinyl) arsinous chloride ("L2") or tris (2-chlorovinyl) arsine ("L3"). The Lewisite may include 2-chlorovinylarsonous dichloride ("L1"), L2 and L3.

In some embodiments, the arsenic-based vesicant includes at least one of diphenylchloroarsine ("DA"), phenyldichloroarsine ("PD"), or triphenylarsine ("TPA").

In some embodiments, the combining comprises combining the permanganate with a total weight of arsenic-based vesicant of at least about 250 grams. The total weight of permanganate may be at least about 250 grams (e.g., at least about 1000 grams).

In some embodiments, the combining comprises combining the permanganate with a total weight of arsenic-based vesicant of at least about 1500 grams. The total weight of permanganate may be at least about 1500 grams (e.g., at least about 6000 grams).

The combining may include combining the arsenic-based vesicant and the permanganate with the permanganate as a permanganate solution (e.g., a solution including sodium permanganate). In some embodiments, a ratio of a total volume of the permanganate solution to a total volume of arsenic-based vesicant is about 100 or less (e.g., about 60 or less).

In some embodiments, the combining includes combining the arsenic-based vesicant and permanganate in the presence of copper metal or a copper alloy. The weight of copper in the copper metal or copper alloy may be at least about 200 grams.

In some embodiments, the method further includes releasing the arsenic-based vesicant from a munition before completing the combining step. An explosive charge positioned externally of the munition can be used to release the vesicant.

The method can further include heating the arsenic-based vesicant and permanganate to a temperature of at least about 50° C. for a time of at least about 30 minutes.

In some embodiments, the arsenic-based vesicant and permanganate are combined within a vessel having a volume of about 20 cubic meters or less.

Another aspect of the invention relates to a method for processing an arsenic-based vesicant. The method includes combining at least one arsenic-based vesicant and a permanganate solution. A ratio of a total weight of the permanganate solution to a total weight of arsenic-based vesicant is typically about 75:1 or less (e.g., about 50 or less).

In some embodiments, the combining includes combining the permanganate solution and a total weight of arsenic-based vesicant of at least about 500 grams.

In some embodiments, the arsenic-based vesicant includes at least one Lewisite and the combining includes combining the permanganate solution and a total weight of Lewisite of at least about 500 grams.

Another aspect of the invention relates to a method for processing an arsenic-based vesicant. The method includes combining at least one arsenic-based vesicant and permanganate in the presence of at least one of copper metal or a copper alloy.

In some embodiments, the copper metal or copper alloy includes portions of a munition and/or portions of an explosive device.

A total weight copper of the copper metal or copper alloy to a total weight of arsenic-based vesicant is about 0.05 or more.

In some embodiments, a total weight of arsenic based vesicant is at least about 250 grams. The total weight of permanganate may be at least about 250 grams.

In general, methods described herein can at least partially neutralize vesicants including, for example, each Lewisite form (e.g., L1, L2, and L3) and phenylarsines (e.g., DA, PD, and TPA).

Methods described herein can typically process vesicants (e.g., arsenic-based vesicants) without producing an excessive amount of waste.

Typically, methods described herein allows vesicants to be processed in the presence of metal (e.g., copper and/or iron). Hence, the methods can be used to process vesicants released from munitions using explosives, where the munitions or explosives produce metal fragments.

The details of one or more embodiments of the invention are set forth in the accompanying drawings and the description below. Other features, objects, and advantages of the invention will be apparent from the description and drawings, and from the claims.

DESCRIPTION OF DRAWINGS

The FIGURE illustrates a mobile system for processing vesicants and other irritants.

Like reference symbols in the various drawings indicate like elements.

DETAILED DESCRIPTION

A method for processing an agent (e.g., a vesicant, irritant, or combination thereof) includes combining the agent and permanganate ($MnO_4^-$). The processing is generally performed in the presence of water and can be carried out in bulk. For example, agent can be released from a munition into a containment vessel. Permanganate in the form of an aqueous permanganate solution is added to the released agent in the containment vessel. The materials within the vessel may be heated and/or agitated for a period of time to process the agent. The processed agent is moved into one or more receptacles for transport or storage.

In general, the processing at least partially neutralizes the agent. For example, the processing may reduce a toxicity of the processed agent, enhance an ability to handle (e.g., move, transport) the agent, and/or enhance an ability to store the agent. Processing may reduce a toxicity of the agent by decreasing a tendency of the agent to damage (e.g., blister) mammalian tissue. The processing may reduce a toxicity of agent by oxidizing certain species (e.g., metals such as arsenic) to a less toxic form. Processing may enhance handling and/or storage of the agent by, for example, providing a non-volatile aqueous solution as a product.

In some embodiments, the agent includes one or more arsenic-based vesicants. For example, the agent can include Lewisite (e.g., at least one of L1, L2, or L3). In some cases, the agent includes at least some of one or both of L2 and L3 (e.g., at least about 1% by weight, at least about 2.5% by weight, at least about 5% by weight of one or both L2 and L3). The agent can include at least some of all of L1, L2, and L3. The agent may include other arsenic-based vesicants (e.g., at least one of DA or PD) or arsenic-based irritants (e.g., TPA).

As an example of a result of processing an arsenic-based vesicant with permanganate but without being bound by theory, it is believed that typical reaction products of processing Lewisite with permanganate in the presence of water include $AsO_4^{3-}$, $MnO_2$, $CO_2$, Cl-, and H+. The arsenic of $AsO_4^{3-}$ has a pentavalent form generally understood to be less toxic than a trivalent form of arsenic.

In addition to or instead of arsenic-based vesicants, the agent can include other vesicants (e.g., one or more mustards). For example, the agent can include at least one of a sulfur based vesicant such as HD—sulphur mustard or a nitrogen based vesicant such as HN-3 nitrogen mustard.

The agent can include a combination of vesicants. For example, the vesicant can include Lewisite (e.g., at least one of L1, L2, or L3) and one or more other vesicants (e.g., another arsenic-based vesicant (e.g., at least one of DA or PD), one or more non-arsenic based vesicants (e.g., one or more mustards), one or more other irritants (e.g., at least one of TPA or lacrimator), or combination thereof).

The agent and permanganate are typically combined within a container (e.g., a tank, a drum, a reaction vessel, an explosive containment vessel, a flask) formed of suitable materials. For example, the container may be formed at least in part of metal (e.g., stainless steel or titanium), a polymer (e.g., a fluorinated polymer), or a glass (e.g., fused silica). The container typically has a volume of about 20 cubic meters or less (e.g., about 15 cubic meters or less, about 10 cubic meters or less, about 5 cubic meters or less, about 2.5 cubic meters or less).

In some embodiments, the container is an explosive containment vessel configured to safely contain the detonation of an explosive device. For example, the container may be a containment vessel of an explosive destruction system (EDS) used to process munitions by detonating the munitions or otherwise destroying the munitions. An EDS suitable for processing an agent by combining the agent and permanganate is discussed below.

In some embodiments, the container is a vessel (e.g., a tank) used for storage (e.g., short or long-term) of the agent, which may be present as a remnant (e.g., a dry residue or sludge) within the tank.

The agent can have any of various physical forms when processed. For example, at least some (e.g., most or all) of the agent may be a liquid when the agent and permanganate are combined. As another example, at least some (e.g., most or all) of the agent may be a solid or gel.

In some embodiments, the agent and permanganate are combined with at least some (e.g., most or all) of the permanganate as a permanganate solution (e.g., an aqueous permanganate solution). For example, the permanganate solution can be added (e.g., by pouring or flowing along one or more supply lines) to a container that contains at least some (e.g., most or all) of the agent to be combined with the permanganate. Alternatively, the agent can be added to a permanganate solution.

In general, the permanganate concentration of the solution can be as desired. In some embodiments, the permanganate solution is at least about 2.5% by weight $MnO_4^-$ (e.g., at least about 5% by weight $MnO_4^-$, at least about 10% by weight $MnO_4^-$, at least about 15% by weight $MnO_4^-$). The amount of permanganate in the permanganate solution is generally at or below a saturation concentration of the permanganate. In some embodiments, the weight of $MnO_4^-$ of the permanganate solution is about 35% or less (e.g., about 30% or less, about 25% or less).

Typically, the solution includes permanganate in combination with an alkali metal (e.g., sodium permanganate ($NaMnO_4$), potassium permanganate ($KMnO_4$), or a combination thereof). For example, the permanganate solution may be at least about 2.5% by weight $NaMnO_4$ (e.g., at least about 5% by weight $NaMnO_4$, at least about 10% by weight $NaMnO_4$, at least about 15% by weight $NaMnO_4$, at least about 20% by weight $NaMnO_4$). In some embodiments, the weight of $NaMnO_4$ of the permanganate solution is about 40% or less (e.g., about 35% or less, about 30% or less). Most (e.g., all) of the permanganate of the permanganate solution may originate from $NaMnO_4$. An exemplary solution is about 20% by weight $NaMnO_4$ and may have little or no $MnO_4^-$ from other sources.

The permanganate solution and agent may be combined in a volume ratio as desired. In some embodiments, a ratio of a total volume of the permanganate solution to a total volume of agent is about 100 or less (e.g., about 75 or less, about 60 or less, about 50 or less). For example, about 1 liter of Lewisite (e.g., about 1900 grams of liquid Lewisite) can be processed by combining the Lewisite with about 100 liters or less (e.g., about 75 liters or less, about 60 liters or less or less, about 50 liters or less) of permanganate solution (e.g., a 20% by weight NaMnO$_4$ solution).

The agent and permanganate can be combined with the agent having a weight as desired. In some embodiments, the total weight of agent (e.g., a total weight of Lewisite or a total weight of DA, PD, and/or TPA) is at least about 250 grams (e.g., at least about 500 grams, at least about 1000 grams, at least about 1500 grams). For example, agent present in a munition (e.g., a 4.2 inch munition having about 3450 grams of agent (e.g., Lewisite)) can be processed by combining the agent and permanganate. As another example, the agent may include DA, PD, and/or TPA and the total weight of the DA, PD, and/or TPA may be at least about 250 grams (e.g., at least about 500 grams, at least about 1000 grams, at least about 1500 grams).

The agent and permanganate can be combined with the permanganate having a weight as desired. In some embodiments, the agent is combined with at least about 500 grams MnO$_4^-$ (e.g., at least about 1000 grams MnO$_4^-$, at least about 1500 grams MnO$_4^-$, at least about 5,000 grams MnO$_{4-}$, at least about 10,000 grams MnO$_4^-$).

The agent and permanganate can be combined with a ratio of the weight of permanganate and the weight of agent (e.g., a total weight of Lewisite or a total weight of DA, PD, and/or TPA) as desired. Typically, the weight of MnO$_4^-$ is at least as great as a weight of the agent (e.g., a total weight of Lewisite or a total weight of DA, PD, and/or TPA). In some embodiments, the ratio of a weight of MnO$_4^-$ to a weight of agent is at least about 1.5 (e.g., at least about 2.5, at least about 3.5, at least about 5). In some embodiments, the ratio of a weight of MnO$_4^-$ to a weight of agent is about 100 or less (e.g., about 50 or less, about 25 or less, about 15 or less, about 7.5 or less). For example, about 1900 grams of agent (e.g., Lewisite) can be processed by combining the agent and about 10,000 grams MnO$_4^-$, an approximately 5.3:1 MnO$_4^-$ to agent weight ratio.

The ratio of permanganate to agent can also be expressed as a molar ratio. In some embodiments, the molar ratio of MnO$_4^-$ to agent is at least about 2 (e.g., at least about 3, at least about 4, at least about 5). In some cases, the molar ratio of MnO$_4^-$ to agent is about 25 or less (e.g., about 20 or less, about 15 or less, about 10 or less). For example, Lewisite can be processed by combining the permanganate and Lewisite in a MnO$_4^-$ to Lewisite molar ratio of about 9.2.

A temperature of the permanganate solution when combined with the agent may be as desired. For example, the permanganate solution may be at ambient temperature (e.g., between about 0 and 40° C., between about 10 and 30° C.) when combined with the agent. In some embodiments, the temperature of the permanganate solution is higher than typical ambient temperatures when combined with the agent. For example, the temperature of the permanganate solution may be at least about 45° C. (e.g., at least about 50° C., at least about 60° C.). In some cases, the temperature of the permanganate solution is between about 40 and 60° C. when combined. The permanganate can be heated by, for example, heating a temperature of a container holding the permanganate and/or heating a temperature of a supply line used to flow the permanganate solution from the container to the agent.

The combined agent and permanganate can be subjected to a temperature as desired and for a time as desired. In some embodiments, the combined agent and permanganate are heated to a temperature that is higher than typical ambient temperatures. For example, the temperature of the combined agent and permanganate may be maintained at a temperature of least about 45° C. (e.g., at least about 50° C., at least about 60° C.) for a period of time (e.g., at least about ½ hour, at least about 1 hour, at least about 2 hours, at least about 4 hours, at least about 6 hours).

In some embodiments, the agent and permanganate are combined in a first container and then moved (e.g., by flowing as through a drain line) to one or more second containers. For example, the agent and permanganate can be combined in a containment vessel in which the agent was released from a munition and then moved to storage or waste receptacles such as transport containers (e.g., drums).

The combining of the agent and permanganate can be mechanically assisted. For example, the agent and permanganate can be agitated by mixing (e.g., using an impeller or bulk motion of a container holding the materials) and/or by flowing the combined materials within a container. In some embodiments, the agent and permanganate are combined in a container and the container is rotated (e.g., about an axis) to assist combining the agent and permanganate. The mechanical assistance can be performed for a period of time as desired. For example, the mechanical assistance can be performed for at least about ½ hour (e.g., at least about 1 hour, at least about 2 hours, at least about 4 hours, at least about 6 hours).

The agent and permanganate can be combined in the presence of a metal (e.g., copper metal (e.g., a copper alloy), iron, or combination thereof). The metal may be in the form of fragments (e.g., fragments of a munition and/or fragments formed by detonation of an explosive charge used to release agent from a munition). In some embodiments, a weight of copper of the copper metal is at least about 200 grams (e.g., at least about 250 grams, at least about 300 grams, at least about 350 grams). In some embodiments, a ratio of a weight of copper of the copper metal to a weight of agent is at least about 0.05 (e.g., at least about 0.1, at least about 0.2). Similar amounts of iron may be present.

The FIGURE illustrates an Explosive Destruction System (EDS) 10 suitable for processing the agent payload (e.g., vesicants such as arsenic-based vesicants and mustards described herein and/or irritants) of munitions. The EDS is described in U.S. Pat. No. 6,881,383, which is incorporated herein by reference. EDS 10 includes an explosive containment vessel 12, reagent supply tanks 14 connected to containment vessel 12 by supply lines 16, waste receptacles 18 connected to containment vessel 12 by drain lines 20, an inert gas (e.g., helium) container 21 connected to containment vessel 12 by supply line 22, an hydraulic oscillation pump 25 for agitating (e.g., by rotation) containment vessel 12, an electrical supply line 27, and a heating system (not shown) for heating contents of vessel 12 and/or reagent to be combined with agent within vessel 12. EDS 10 is operated using control panels 24.

EDS 10 also includes an explosive access system for releasing the agent payload of a munition. The explosive access system includes a shaped charge explosive assembly configured to rupture the munition and destroy any explosive charge it may have. The EDS includes a firing system 26 to operate the explosive access system. Actuation of the explosive access system releases copper fragments within the fragmentation vessel.

The EDS can be operated as desired to process a vesicant or irritant. Typically, a munition having an agent payload (e.g., a 4.2 lb Lewisite-containing munition) is placed in containment vessel 12. The explosive access system is positioned to release the payload of the munition. Vessel 12 is sealed. The explosive access system is actuated to release the agent from the munition. The containment vessel contains both the explosion of the access system and the agent released from the munition.

Reagent (e.g., permanganate solution such as a 20% by weight NaMnO$_4$ solution) is introduced to vessel 12 from reagent supply tanks 14 by flowing along supply lines 16 to combine the released agent and permanganate. Containment vessel 12 typically has a total volume of about 5 cubic meters or less (e.g., about 2.5 cubic meters or less). During operation, the total volume of agent and permanganate is typically at least about 0.025 cubic meters (e.g., at least about 0.1 cubic meters, at least about 0.4 cubic meters). Containment vessel 12 is rotated to mechanically assist combination of the agent and permanganate. The heating system can be actuated to heat contents of vessel 12 and/or the reagent that is introduced to vessel 12.

Inert gas from container 21 can be introduced to the headspace above the combined agent and reagent. The inert gas is typically introduced to dilute gases (e.g., oxygen and/or hydrogen) which can form when agents are processed by combining the agent and permanganate.

After a desired period of time, material (e.g., combined agent and reagent) within vessel 12 can be moved to waste receptacles 20 using drain lines 22. Typically, processing of agents forms a manganese precipitate (e.g., manganese dioxide) and, for arsenic-based vesicants, forms arsenic containing precipitates. Precipitates can be removed from the container mechanically. Fragments of the munition and explosive access system (e.g., copper metal) are also removed. Cleaning solutions of, for example, acetic acid/hydrogen peroxide or oxone/hydrogen peroxide can be used to further clean interior surfaces and fittings of the EDS.

An example of an explosive destruction system is also described in a paper by K. Tschritter et al. titled EXPLOSIVE DESTRUCTION SYSTEM, which is incorporated herein by reference. This paper was unpublished and presented as part of the "Chemical Weapons Demilitarization" symposium held Jun. 7–9, 1999, in Vienna, Austria. A copy of the paper has been provided herewith.

While methods for processing an agent have been described as including combining a liquid, solid, or gel agent and permanganate, at least some (e.g., most or all) of the agent may be in another physical state. For example, the agent may include gaseous agent. Methods for processing gaseous agents can include combining the agent and permanganate by flowing the agent through a permanganate solution (e.g., by sparging a permanganate solution with the gaseous agent).

EXAMPLES

The following examples illustrate methods and systems for processing agents.

Example 1

Processing Arsenic-Based Vesicants by Combination with Permanganate

An agent including a combination of arsenic-based vesicants (0.01 total liters of agent being about 59% by weight DA, 28.4% by weight PD, and 3.6% by weight TPA) was added to a 0.6 liter 316-stainless steel reaction vessel. Reagent (an aqueous sodium permanganate solution, 0.5 liters, 20% NaMnO$_4$ by weight) was combined with the agent within the vessel. Iron and copper metal fragments (15 grams iron, 2.5 grams copper) were added to the vessel. The ratios of the weights of reagent, agent, iron, and copper correspond to the amounts of these materials that would be present when agent was released from a 4.2-in. mortar round by detonating a shaped charge placed external to the mortar round.

The vessel was sealed and charged with nitrogen to about 7 psi. The contents of the vessel were heated to a temperature of 60° C. for a time of 24 hours with stirring by an impeller. Samples were drawn from the vessel at 1.25, 3.5, 5.5, and 24 hours. The samples were analyzed for the presence of the agent and residual arsenic compounds.

Based on the analyzed samples, the residual concentrations of the DA, PD, and TPA were each less than about 5000 mg/L after 1.25 hours. DA and PD concentrations were negligible after 3.5 hours. TPA concentration was less than about 100 mg/L after 3.5 hours and negligible after 5.5 hours.

Example 2

Processing Arsenic-Based Vesicants by Combination with Permanganate

The steps of Example 1 were repeated with the exception that the contents of the vessel were heated to 80° C.

Based on the analyzed samples, the residual concentrations of the DA, PD, and TPA were somewhat less than those determined after corresponding times in Example 1.

Example 3

Processing an Arsenic-Based Based Vesicant Munition

A munition (a 105 mm projectile) believed based on an X-ray analysis to contain about 1451 grams Lewisite (about 0.77 liters Lewisite) was placed in the fragmentation vessel of an EDS. The fragmentation vessel was cylindrical oriented with its central axis horizontal. The Lewisite was released from the munition by rupturing the munition with a shaped charge system including a linear charge and a shaped charge positioned externally of the munition. The linear charge severed the munition in half while the shaped charge destroyed any explosive charge present within the munition.

Reagent in the form of an aqueous sodium permanganate solution (85 liters of an ambient temperature solution having a concentration of 20% by weight NaMnO4) was introduced to the vessel to combine the permanganate and released Lewisite in a reagent vol. to total Lewisite vol. ratio of 50:1. Fragments (e.g., iron, copper metal, or copper alloy) present from the ruptured munition and shaped charges were present in the vessel. The heating system of the EDS was actuated to raise the temperature of the vessel contents to 60° C. This temperature was maintained for a heating period of 6 hours. During this time, the vessel contents were agitated by rotating the vessel about its central axis.

After the 6 hour heating period, the contents of the vessel were sampled and the heating system was turned off. The vessel contents allowed to cool overnight (a cool-down period of about 12 hours) without agitation. The vessel contents were also sampled at 18 hours and at 24 hours.

After the cool-down period, agitation of the vessel contents (by vessel rotation) was renewed. Helium was introduced into headspace (about 50 to 100 psi) of the vessel to dilute H2 and O2 that may have been produced. The gas present in the headspace was then vented. Agitation was stopped.

Contents of the fragmentation vessel were drained into a waste receptacle. Ambient temperature water (about 80 liters) was introduced into the fragmentation vessel and agitated by rotation for 30 minutes at ambient temperature. Agitation was stopped and the water was drained into a waste receptacle. Additional ambient temperature water (about 60 liters) was introduced into the fragmentation vessel and agitated by rotation for 10 minutes at ambient temperature. Agitation was stopped and the water was drained into a waste receptacle. The vessel was pressurized with helium to assist removal of material from the EDS drain lines.

The gas present in the vessel headspace was sampled to determine that the vessel was clear of Lewisite. The vessel was opened and solids (e.g., manganese dioxide precipitates and munitions fragments) resulting from the processing were removed. The interior walls of the vessel were scrubbed with a bleach solution to remove residual arsenic. A cleaning solution (e.g., a vinegar/hydrogen peroxide solution or an oxone/hydrogen peroxide solution) was used to flush lines and fittings of the EDS.

The above steps were repeated 4 additional times.

Analysis of the samples obtained after the 6 hour heating period showed that the average residual concentrations of the L1, L2, and L3 forms for the 5 procedures were about 50 mg/L or less for each form.

Analyses of the samples obtained after 18 and 24 hours showed that the residual concentrations of the L1, L2, and L3 form were less than about 10 mg/L for each form.

Example 4

Processing Lewisite-Containing Munitions

A munition (a 4.2-in. mortar round) containing 3450 grams Lewisite was processed according the steps followed in Example 3 using permanganate solution (about 90 liters of 20% NaMnO4 solution) and with the following additional exceptions. The heating period was 6 hours instead of 4. After the heating period, the heating system was turned off and the vessel contents allowed to cool overnight (a cool-down period of about 12 hours) without agitation. The vessel contents were also sampled at 18 hours and at 24 hours.

Analysis of the sample obtained after the 6 hour heating period showed that the residual concentrations of the L1, L2, and L3 forms were each less than 50 parts per million.

Analyses of the samples obtained after 18 and 24 hours showed that the residual concentrations of the L1, L2, and L3 forms were each less than 10 parts per million.

Example 5

Processing Simulated Lewisite-Containing Munitions

A DOT bottle containing 3,450 grams munitions-grade Lewisite was processed according the steps followed in Example 4. The process was repeated twice using additional DOT bottle.

Analysis of the samples obtained after the 6 hour heating period showed that the average residual concentrations of the L1, L2, and L3 forms from the three procedures were less than 50 parts per million for each form.

Analyses of the samples obtained after 18 and 24 hours showed that the average residual concentrations of the L1, L2, and L3 forms were less than 10 parts per million.

Example 6

Processing Other Arsenic-Based Compounds

A Department of Transportation (DOT) bottle containing about 2 liters of a combination of arsenic based vesicants as described in Example 1 was placed in the fragmentation vessel of an EDS. The fragmentation vessel was cylindrical oriented with its central axis horizontal. The Arsenic-Based vesicants were released from the DOT bottle by rupturing the DOT bottle with a shaped charge system including a linear charge and a shaped charge positioned externally of the DOT bottle. The linear charge severed the DOT bottle in half while the shaped charge simulated destruction of the explosive charge which would be present in an actual munition.

Reagent in the form of an aqueous sodium permanganate solution (100 liters of an ambient temperature solution having a concentration of 20% by weight NaMnO4) was introduced to the vessel to combine the permanganate and released agent in a reagent vol. to total agent vol. ratio of 50:1. Fragments (e.g., iron, copper metal, or copper alloy) present from the ruptured munition and shaped charges were present in the vessel. The heating system of the EDS was actuated to raise the temperature of the vessel contents to 60° C. This temperature was maintained for a heating period of 4 hours. During this time, the vessel contents were agitated by rotating the vessel about its central axis.

After the 4 hour heating period, the contents of the vessel were sampled, the heating system was turned off, and agitation stopped. The contents of the fragmentation vessel were drained into a waste receptacle. Ambient temperature water (about 80 liters) was introduced into the fragmentation vessel and agitated by rotation for 10 minutes without heating. Agitation was stopped and the water was allowed to sit in the vessel overnight (about 12 hours). The water was drained and additional ambient temperature water was introduced into the fragmentation vessel and agitated by rotation for 10 minutes without heating. Agitation was stopped and the water was drained into a waste receptacle. The vessel was pressurized with helium to assist removal of material from the EDS drain lines.

The gas present in the vessel headspace was sampled to determine that the vessel was clear of the agents of the arsenical payload. The EDS was cleaned as in Example 4.

Analysis of the samples obtained after about hour of the heating period showed that the average residual concentrations of DA, PD, and TPA were each about 5 mg/L or less for the 2 procedures. Analysis of samples obtained after about 3 hours of the heating period showed that the average residual concentrations of DA, PD, and TPA were each about 3 mg/L or less for the 2 procedures. Residual concentrations were about 1 mg/L or less after about 4 hours of the heating period.

Example 7

Processing of a Lewisite-Containing Sludge

Lewisite-contaminated sludge is processed. The sludge was about 36% by weight arsenic and about 3.6% by weight iron.

Permanganate in the form of an aqueous sodium permanganate reagent solution (0.1 liters of an ambient temperature solution having a concentration of 20% by weight NaMnO$_4$) is introduced to a 250 ml flask containing about 6.5 grams of a Lewisite-contaminated sludge (0.02 wt % L1, 0.1 wt %

L2, 5.1 wt % L3). The solution was heated to 37.8° C. with nitrogen purging. Samples were drawn at 2, 4, 6, and 24 hours and analyzed to determine the amount of residual agent present in the sludge.

The above procedure was repeated with a second sludge sample but using a solution of 10% NaOH in 5% NaOCl.

For each sample drawn, the amount of each form of Lewisite was lower for the sludge processed with permanganate. The amount of residual L3 in the permanganate processed sludge was about $\frac{1}{200}$th or less than the amount of residual L3 in the NaOH processed sludge.

Lewisite-contaminated sludge present in ton-containers was also processed using aqueous sodium permanganate solution.

Example 8

Processing Lewisite

Permanganate in the form of an aqueous sodium permanganate reagent solution (0.1 liters of an ambient temperature solution having a concentration of 20% by weight $NaMnO_4$) was combined with Lewisite (0.002 liters) in a 0.25 liter glass reactor. The ratio of the permanganate solution vol. to total Lewisite vol. was 50:1. About 0.5 grams copper and 5 grams of common steel were added to the reactor. The reactor contents were heated to 60° C. for 6 hours with nitrogen purging. After 6 hours, the reactor contents were sampled. Analysis of the sample showed that the amounts of residual Lewisite were L1=0.16 mg/L, L2=trace, and L3 was not detectable.

Example 9

Processing HD—Sulphur Mustard

Permanganate in the form of an aqueous sodium permanganate reagent solution (0.1 liters of an ambient temperature solution having a concentration of 20% by weight $NaMnO_4$) was combined with HD-sulphur mustard (0.002 liters) in a 0.25 liter glass reactor. The ratio of the permanganate solution vol. to HD-sulphur mustard vol. was 50:1. The reactor contents were heated to 75° C. for 6 hours. After 6 hours, the reactor contents were sampled. Analysis of the sample showed that the amount of HD-sulphur mustard was less than about 0.05 mg/L.

Example 10

Processing HN-3 Nitrogen Mustard

Permanganate in the form of an aqueous sodium permanganate reagent solution (0.1 liters of an ambient temperature solution having a concentration of 20% by weight $NaMnO_4$) was combined with HN-3 nitrogen mustard (0.002 liters) in a 0.25 liter glass reactor. The ratio of the permanganate solution vol. to HN-3 nitrogen mustard vol. was 50:1. The reactor contents were heated to 75° C. for 6 hours. After 6 hours, the reactor contents were sampled. Analysis of the sample showed that the amount of HN-3 nitrogen mustard was about 0.22 mg/L.

Other embodiments are within the claims.

What is claimed is:

1. A method for processing Lewisite and other arsenic-based vesicants, comprising:
combining 2-chlorovinylarsonous dichloride ("L1"), bis (2-chlorovinyl) arsinous chloride ("L2"), and tris (2-chlorovinyl) arsine ("L3") with an aqueous sodium permanganate solution, and wherein said combining comprises combining said aqueous sodium permanganate solution with a total weight of Lewisite L1, L2, and L3 of at least about 250 grams.

2. The method of claim 1, wherein said combining comprises combining said Lewisite L1, L2, and L3 with a total weight of aqueous sodium permanganate of at least about 250 grams.

3. The method of claim 2, wherein the total weight of aqueous sodium permanganate solution is at least about 1000 grams.

4. The method of claim 1, wherein said aqueous sodium permanganate solution comprises about 20% by weight sodium permanganate.

5. The method of claim 1, wherein the ratio of the total volume of said aqueous sodium permanganate solution to the total volume of Lewisite L1, L2, and L3, is about 100 or less.

6. The method of claim 5, wherein said ratio is about 60 or less.

7. The method of claim 1, wherein the total weight of said Lewisite L1, L2, and L3, is about at leas 1500 grams.

8. The method of claim 7, wherein said combining comprises combining said Lewisite L1, L2, and L3, with a total weight of sodium permanganate solution of at least about 1,500 grams.

9. The method of claim 8, wherein the total weight of aqueous sodium permanganate solution is at least about 6000 grams.

10. The method of claim 9, wherein said aqueous sodium permanganate solution comprises about 20% by weight sodium permanganate.

11. The method of claim 10, wherein the ratio of the total volume of the aqueous sodium permanganate solution to the total volume of Lewisite is about 100 or less.

12. The method of claim 11, wherein said ratio is about 60 or less.

13. The method of claim 1, wherein said combining comprises combining said Lewisite L1, L2, and L3 with aqueous sodium permanganate in the presence of copper metal or a copper alloy.

14. The method of claim 13, wherein the weight of copper in the copper metal or copper alloy is at least about 200 grams.

15. The method of claim 1, further comprising releasing said Lewisite L1, L2, or L3 from a munition before completing said combining step.

16. The method of claim 15, wherein said releasing comprises detonating an explosive charge positioned externally of the munition.

17. The method of claim 1, further comprising heating said Lewisite L1, L2, and L3 and said aqueous sodium permanganate solution to temperature of at least about 50° C. for a time of at least about 30 minutes.

18. The method of claim 1, wherein said combining comprises combining the Lewisite L1, L2, and L3 and sodium permanganate solution within a vessel having a volume of about 20 cubic meters or less.

19. The method of claim 1, wherein said arsenic-based vesicant comprises at least one of the diphenylchloroarsine ("DA"), phenyldichloroarsine ("PD"), or triphenylarsine ("TPA"), and wherein said combing comprises combing said sodium permanganate solution and a total weight of said at least on DA, PD, or TPA of at least about 250 grams.

20. The method of claim 19, wherein said combining comprises combining said at least one of a DA, PD, or TPA and total weight of sodium permanganate of at least about 250 grams.

21. The method of claim 20, wherein said total weight of sodium permanganate is at least 1000 grams.

22. The method of claim 19, wherein said aqueous sodium permanganate solution comprises about 20% by weight sodium permanganate.

23. The method of claim 22, wherein the ratio of the total volume of the sodium permanganate solution to the total volume of at least one of a DA, PD, or TPA is about 100 or less.

24. A method for processing Lewisite and other vesicants, comprising:

combining Lewisite comprising L1, L2, and L3 and a sodium permanganate solution, wherein the ratio of the total weight of the sodium permanganate solution to the total weight of Lewisite L1, L2, and L3 is about 75:1 or less, wherein said combining comprises combining said sodium permanganate solution and a total weight of Lewisite L1, L2, and L3 of at least about 500 grams.

25. The method of claim 24, wherein said ratio is about 50 or less.

26. The method of claim 24, wherein said combining comprises combining the at least on Lewisite L1, L2, and L3 and said sodium permanganate solution within a vessel having a volume of about 20 cubic meters or less.

27. A method for processing a Lewisite, comprising:

combining Lewisite comprising L1, L2, and L3 an sodium permanganate solution in the presence of at least one of copper metal or copper alloy, and wherein the total weight of Lewisite L1, L2, and L3 is at least about 250 grams.

28. The method of claim 27, wherein said copper metal or copper alloy comprises portions of a munition and/or portions of an explosive device.

29. The method of claim 27, wherein the ratio of the total weight of copper of the copper metal or copper alloy to the total weight of Lewisite L1, L2, and L3 is about 0.05 or more.

30. The method of claim 27, wherein the total weight of sodium permanganate solution is at least about 250 grams.

* * * * *